(12) United States Patent
Lee et al.

(10) Patent No.: US 11,221,820 B2
(45) Date of Patent: Jan. 11, 2022

(54) SYSTEM AND METHOD FOR PROCESSING AUDIO BETWEEN MULTIPLE AUDIO SPACES

(71) Applicant: Creative Technology Ltd, Singapore (SG)

(72) Inventors: Teck Chee Lee, Singapore (SG); Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/817,408

(22) Filed: Mar. 12, 2020

(65) Prior Publication Data

US 2020/0301653 A1   Sep. 24, 2020

Related U.S. Application Data

(60) Provisional application No. 62/821,340, filed on Mar. 20, 2019.

(51) Int. Cl.
*G06F 3/16* (2006.01)
*H04R 1/10* (2006.01)
(Continued)

(52) U.S. Cl.
CPC .............. *G06F 3/165* (2013.01); *G10L 25/51* (2013.01); *H04R 1/025* (2013.01); *H04R 1/1041* (2013.01);
(Continued)

(58) Field of Classification Search
CPC . H04S 1/005; H04S 3/004; H04S 5/04; H04S 7/301; H04S 7/304; H04S 7/305;
(Continued)

(56) References Cited

U.S. PATENT DOCUMENTS

| 7,840,019 B2 | 11/2010 | Slaney et al. |
| 7,936,887 B2 | 5/2011 | Smyth |

(Continued)

FOREIGN PATENT DOCUMENTS

| EP | 3595336 A1 | 1/2020 |
| FR | 3051951 B1 | 6/2018 |

(Continued)

OTHER PUBLICATIONS

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.

(Continued)

*Primary Examiner* — Xu Mei
(74) *Attorney, Agent, or Firm* — Russell Swerdon; Desmund Gean (57) ABSTRACT

Techniques are provided to transform external sound from an external position of an external audio space to an internal position of an internal audio space where the external sound would be heard naturally. The techniques involve capturing the external sound with a microphone and processing the captured external sound to appear as if it was captured at the internal position of the internal audio space, which may correspond to an output of a driver or a user's eardrum. Then the processed captured external sound may be conditioned for the individual user or further combined with conditioned audio content to create an augmented audio experience for the user. Any combination of the techniques can be implemented in real time.

22 Claims, 6 Drawing Sheets

(51) Int. Cl.
| | |
|---|---|
| *H04R 3/00* | (2006.01) |
| *H04R 29/00* | (2006.01) |
| *H04S 7/00* | (2006.01) |
| *H04S 1/00* | (2006.01) |
| *G10L 25/51* | (2013.01) |
| *H04R 1/02* | (2006.01) |
| *H04R 1/40* | (2006.01) |

(52) U.S. Cl.
CPC .............. *H04R 1/406* (2013.01); *H04R 3/005* (2013.01); *H04R 29/001* (2013.01); *H04S 1/005* (2013.01); *H04S 7/304* (2013.01); *H04R 2499/13* (2013.01)

(58) Field of Classification Search
CPC ....... H04S 7/306; H04S 2400/11; H04R 5/00; H04R 5/02; H04R 5/027; H04R 5/033; H04R 1/00; H04R 3/005; H04R 29/001; H04R 29/004; H04R 29/005; H04R 2499/13
USPC .......... 381/26, 309, 310, 74, 57, 91, 122, 86
See application file for complete search history.

(56) References Cited

U.S. PATENT DOCUMENTS

| | | | | |
|---|---|---|---|---|
| 8,515,105 | B2* | 8/2013 | Yadegari | H04R 5/02 381/17 |
| 8,787,602 | B2* | 7/2014 | Macours | H04R 5/04 381/300 |
| 9,030,545 | B2 | 5/2015 | Pedersen | |
| 9,544,706 | B1 | 1/2017 | Hirst | |
| 9,602,947 | B2 | 3/2017 | Oh et al. | |
| 10,063,990 | B1 | 8/2018 | Lyren | |
| 10,382,879 | B1* | 8/2019 | Akama | H04R 5/04 |
| 10,462,596 | B2* | 10/2019 | Chon | H04S 7/303 |
| 2005/0080616 | A1* | 4/2005 | Leung | H04R 5/027 704/200.1 |
| 2007/0270988 | A1 | 11/2007 | Goldstein et al. | |
| 2008/0170703 | A1 | 7/2008 | Zivney | |
| 2010/0027820 | A1* | 2/2010 | Kates | H04R 25/505 381/312 |
| 2011/0135101 | A1* | 6/2011 | Matsuura | H04S 1/002 381/26 |
| 2012/0008806 | A1 | 1/2012 | Hess | |
| 2012/0183161 | A1 | 7/2012 | Agevik et al. | |
| 2015/0073262 | A1 | 3/2015 | Roth et al. | |
| 2015/0124975 | A1 | 5/2015 | Pontoppidan | |
| 2015/0312694 | A1 | 10/2015 | Bilinski et al. | |
| 2015/0373477 | A1 | 12/2015 | Norris et al. | |
| 2015/0382127 | A1 | 12/2015 | Sun et al. | |
| 2016/0379041 | A1 | 12/2016 | Rhee et al. | |
| 2018/0091920 | A1 | 3/2018 | Family | |
| 2018/0218507 | A1 | 8/2018 | Hyllus et al. | |
| 2018/0249279 | A1 | 8/2018 | Karapetyan et al. | |
| 2018/0268798 | A1* | 9/2018 | Mustiere | H04R 1/1083 |
| 2018/0373957 | A1 | 12/2018 | Lee et al. | |
| 2019/0215637 | A1 | 7/2019 | Lee et al. | |
| 2019/0215641 | A1 | 7/2019 | Lee et al. | |
| 2019/0220106 | A1* | 7/2019 | Leclercq | A63F 13/69 |

FOREIGN PATENT DOCUMENTS

| | | |
|---|---|---|
| WO | 2017041922 A1 | 3/2017 |
| WO | 2017117293 A1 | 7/2017 |
| WO | 2017/202634 A1 | 11/2017 |

OTHER PUBLICATIONS

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models-Their Training and Application," Computer Vision And Image Understanding, Jan. 1995, pp. 38-59, vol. 61, No. 1, Manchester, England.

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Externalisation of Non-individualised HRTFs by Cluster Analysis," Audio Engineering Society's 133rd Convention Paper, Oct. 26-29, 2012, San Francisco, CA.

Zotkin, Dmitry et al., HRTF Personalization Using Anthropometric Measurements, 2003 IEEE Workshop on Applications of Signal Processing to Audio and Acoustics, Oct. 19-22, 2003, p. 157-160, New Paltz, NY.

Karapetyan et al., Elevation Control in Binaural Rendering, Jun. 4-7, 2016, pp. 1-4, Audio Engineering Society, 140th Convention e-Brief 270, Paris, France.

* cited by examiner

SYSTEM AND METHOD FOR PROCESSING AUDIO BETWEEN MULTIPLE AUDIO SPACES

CROSS REFERENCE TO RELATED APPLICATION

This application claims the benefit of U.S. Provisional Application No. 62/821,340, filed 20 Mar. 2019 and entitled "SYSTEM AND METHOD FOR PROCESSING AUDIO BETWEEN MULTIPLE AUDIO SPACES", the disclosure of which is herein incorporated by reference in its entirety.

BACKGROUND OF THE INVENTION

1. Field of the Invention

The present invention relates to audio processing. More particularly, the present invention relates to a system and method for processing audio between multiple audio spaces.

2. Description of the Related Art

People wearing headphones are often subject to an internal audio space created by the headphones covering their ears and isolated from hearing things in an external audio space (e.g., their surroundings). In order to hear things in the external audio space, people would often have to remove their headphones. Sometimes this could be inconvenient such as for runners listening to music with headphones where removing the headphones could interfere with their running.

Therefore, there is a need to bring sounds from another audio space (e.g., external audio space) into their current audio space (e.g., internal audio space) for listening. Yet, there is another need to make the sounds appear as one would naturally hear them so that it is more realistic. Accordingly, it is desirable to provide systems and methods for processing audio between multiple audio spaces to address the above needs.

SUMMARY OF THE INVENTION

In one aspect of the invention, a method for processing audio between multiple audio spaces with an audio system is provided. The method includes: 1) receiving at least one microphone signal that captures external sound from an external audio space with at least one microphone corresponding to at least one external position; and 2) generating at least one processed microphone signal by processing the at least one microphone signal with at least one microphone transform function in order for virtualizing the capture of the external sound from the at least one microphone corresponding to the at least one external position to at least one internal position corresponding to at least one driver in an internal audio space, the internal and external audio spaces being separated from each other by an audio space boundary.

The method may also include: 3) generating at least one conditioned microphone signal by applying audio conditioning techniques to the at least one processed microphone signal; 4) generating at least one combined output signal by adding the at least one conditioned microphone signal with at least one conditioned audio content signal, the at least one conditioned audio content signal being generated by applying audio conditioning techniques to an audio content signal; and 5) rendering the at least one combined output signal via the at least one driver for playback in the internal audio space, whereby the playback includes the external sound virtually captured by the at least one microphone at the at least one internal position and audio content captured on the audio content signal.

According to various embodiments, the number of microphones does not match the number of drivers; the at least one microphone signal captures external sound from the external audio space in real time; the microphone transform function implements a convolution involving the at least one microphone signal corresponding to the at least one external position, the at least one microphone signal corresponding to the at least one internal position, and at least one impulse response signal corresponding to the at least one external position and the at least one internal position; generating at least one processed microphone signal includes enhancing certain sounds of the captured external sound that humans are unable to hear; the at least one microphone signal is preconditioned by applying audio preconditioning techniques to the at least one microphone signal, the audio preconditioning techniques including: noise canceling, noise reduction, or microphone transforms for changing signal domains; the at least one microphone signal captures external sound from the external audio space in a recording; generating at least one processed microphone signal includes saving the at least one processed microphone signal for later playback; or the audio space boundary attenuates open air transmission of the external sound from the external audio space to the internal audio space.

In another aspect of the invention, an audio system for processing audio between multiple audio spaces is provided. The audio system includes at least one microphone transform function module configured for: 1) receiving at least one microphone signal that captures external sound from an external audio space with at least one microphone corresponding to at least one external position, and 2) for generating at least one processed microphone signal by processing the at least one microphone signal with at least one microphone transform function in order for virtualizing the capture of the external sound from the at least one microphone corresponding to the at least one external position to at least one internal position corresponding to at least one driver in an internal audio space, the internal and external audio spaces being separated from each other by an audio space boundary.

The invention extends to a machine readable medium embodying a sequence of instructions that, when executed by a machine, cause the machine to carry out any of the methods described herein.

Some of the advantages of the present invention include: 1) realistic reproduction of external sound from external audio space to internal audio space; 2) facilitates user situational awareness of surroundings; 3) facilitates user interaction with people or things in the surroundings; 4) recordings that capture sounds that one would naturally hear them; 5) systems and methods for processing audio between multiple audio spaces in real time; 6) low system latency. These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

Techniques of the present invention are provided to transform external sound from an external position of an external audio space to an internal position of an internal audio space where the external sound would be heard naturally. The techniques involve capturing the external sound with a microphone and processing the captured external sound to appear as if it was captured at the internal position of the internal audio space, which may correspond to an output of a driver or a user's eardrum. Then the processed captured external sound may be conditioned for the individual user or further combined with conditioned audio content to create an augmented audio experience for the user.

Conditioning may include, among other things, Biaural Room Impulse Response (BRIR), Biaural Room Transfer Function (BRTF), Head-Related Impulse Response (HRIR), or Head-Related Transfer Function (HRTF) personalization, which can be implemented based on Applicant's U.S. patent application Ser. No. 16/062,521, filed 14 Jun. 2018 and entitled "A METHOD FOR GENERATING A CUSTOMIZED/PERSONALIZED HEAD RELATED TRANSFER FUNCTION", which is herein incorporated by reference in its entirety. The personalization can include capturing an image of an ear using a portable device, auto-scaling the captured image to determine physical geometries of the ear and obtaining a personalized HRTF based on the determined physical geometries of the ear.

Further, techniques of the present invention can be incorporated with methods and systems for customizing audio experience which can be implemented based on Applicant's U.S. patent application Ser. No. 16/279,929, filed 19 Feb. 2019 and entitled "SYSTEM AND A PROCESSING METHOD FOR CUSTOMIZING AUDIO EXPERIENCE", which is herein incorporated by reference in its entirety. Customization of audio experience can be based on derivation of at least one customized audio response characteristic which can be applied to an audio device used by a person. The customized audio response characteristic(s) can be unique to the person.

Finally, techniques of the present invention can be incorporated with methods and systems for rendering audio over headphones with head tracking enabled by, for example, exploiting efficiencies in creating databases and filters for use in filtering 3D audio sources for more realistic audio rendering and also allowing greater head movement to enhance the spatial audio perception, which can be implemented based on Applicant's U.S. patent application Ser. No. 16/136,211, filed 19 Sep. 2018 and entitled "METHOD FOR GENERATING CUSTOMIZED SPATIAL AUDIO WITH HEAD TRACKING", which is herein incorporated by reference in its entirety.

Figure 1:
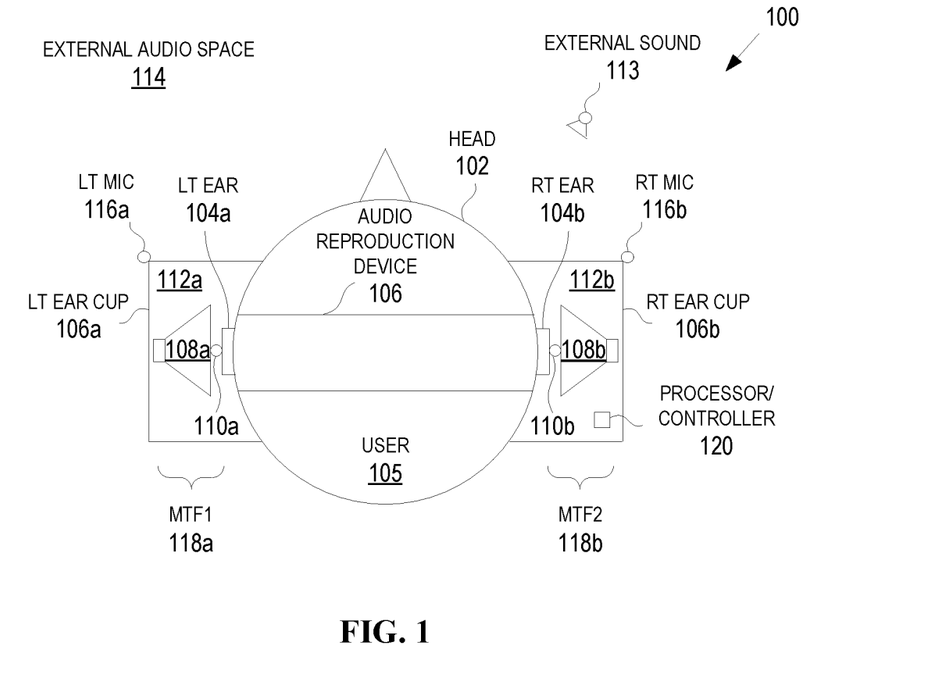
FIG. 1 is an audio system for processing audio between multiple audio spaces involving a single audio reproduction device according to various embodiments of the present invention.

FIG. 1 is an audio system 100 for processing audio between multiple audio spaces involving a single audio reproduction device 106 according to various embodiments of the present invention. Audio system 100 includes audio reproduction device 106, which may be any type of audio sound producing device. For example, audio reproduction device 106 may include headphones such as monitors, earbuds, earpieces, headsets, in-ear headphones, on-ear headphones, over the ear headphones, open back headphones, and closed back headphones. Audio reproduction device 106 may include one or more drivers such as left driver 108a and right driver 108b with corresponding left driver output 110a and right driver output 110b as well as one or more ear cups such as left ear cup 106a and right ear cup 106b. Drivers are also known as transducers, speaker drivers, or loudspeakers. As shown, audio reproduction device 106 is worn over a head 102 of a user 105 with left ear cup 106a and right ear cup 106b covering user's left ear 104a and right ear 104b respectively and creating one or more internal audio spaces such as 112a and 112b for user 105 to hear in. Due to a seal that audio reproduction device 106 makes with head 102, such as how the ear cups are positioned around the ears, user 105 may only hear things in internal audio space 112a and 112b and isolated from hearing things from external audio space 114. The seal of audio reproduction device 106 creates an audio space boundary between external audio space 114 and each of internal audio spaces 112a and 112b. The audio space boundary can be of any size whereby external sound 113 is hindered from being heard within internal audio spaces 112a and 112b. Generally, external sound 113 would be acoustic environment or ambient noise.

According to various embodiments, microphones such as left microphone 116a and right microphone 116b are positioned anywhere near the audio space boundary where external sound 113 can be captured. For example, left microphone 116a and right microphone 116b are shown positioned at corners along left ear cup 106a and right ear cup 106b. The captured external sound 113 is then processed with corresponding microphone transform functions 118a and 118b. Microphone transform function (hereinafter "MTF") is configured to transform/virtualize the external sound captured at external position (where the microphone captures the external sound) to appear as it was captured at an internal position, for example, where it could facilitate being heard naturally by user 105 such as the positions of driver output or along a user's auditory path to the user's eardrum. Each internal position or ear cups 106a and 106b or audio reproduction device 106 would have their own MTF, such as MTF1 and MTF2 as shown in FIG. 1.

The MTF can be unique or same between multiple MTFs depending on various factors such as: 1) the specifications of internal audio spaces 112a, 112b; ear cups 106a, 106b; microphones 116a, 116b; and drivers 108a, 108b; 2) relative positions (measured by distances using any coordinate domain) of microphones 116a, 116b; drivers 108a, 108b; driver outputs 110a, 110b, external positions; internal positions; and 3) any factor/variable that is necessary to transform/virtualize the external sound captured at external position (where the microphone captures the external sound) to appear as it was captured at an internal position, for example, where it could facilitate being heard naturally by user 105 such as the positions of driver output or along a user's auditory path to the user's eardrum. The specifications may include, but is not limited to, the size, type, impulse response, frequency range, system latency, driver characteristics, etc. Further, any technique may be used to take account these factors to achieve the transformation/virtualization such as applying one or more convolutions. By knowing as much information on audio system 100 as possible, the better audio system 100 can perform. Processor/controller 120 can be configured to perform the processing of audio between multiple audio spaces according to various embodiments of the present invention.

Advantageously, external sound 113 can be heard by user 105 from the perspective of where user's ears are instead of where the capture occurs with the microphone, which may be some distance away from the user's ears. The present invention is different from simply broadcasting the external sound captured by a microphone positioned away from the user's ears into the user's ears without processing it in ways such as using the techniques of the present invention. In other words, the present invention is able to map the external sound captured from an unnatural position to a natural position to make it more realistic to the user. As such, the present invention allows for natural hearing of external sounds.

Figure 2:
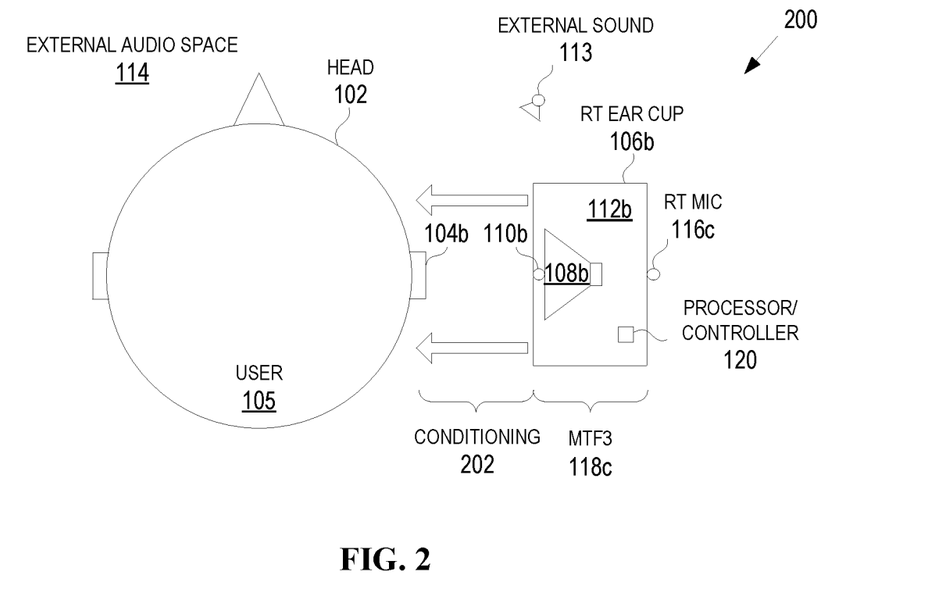
FIG. 2 is an audio system for processing audio between multiple audio spaces with conditioning involving a single audio reproduction device according to various embodiments of the present invention.

FIG. 2 is an audio system 200 for processing audio between multiple audio spaces with conditioning 202 involving a single audio reproduction device according to various embodiments of the present invention. As indicated by the arrows, right ear cup 106b is normally positioned against the head 102 of user 105. However, for purposes of illustrating the implementation of conditioning 202, right ear cup 106b is shown at a distance away from head 102 and right ear 104b. External sound 113 in external audio space 114 can be captured at an external position (i.e, side of right ear cup 106) by right microphone 116c with corresponding right microphone signal and processed with MTF3 118c to generate a processed microphone signal that transforms/virtualizes the capture of external sound 113 at the external position from right microphone 116c to an internal position, which can correspond to the right driver 108b position, right driver output 110b position, or any position within internal audio space 112b, including positions along user's right ear 104b auditory path to the eardrum. By transforming/virtualizing the capture of external sound 113 and applying right ear cup 106b around right ear 104b, user 105 can hear external sound 113 at user's right ear 104b (e.g., when internal position is aligned with user's right ear's or right ear's auditory path to the eardrum) as if it was captured there.

Processed microphone signal can now be conditioned 202 with various audio techniques, including Biaural Room Impulse Response (BRIR), Biaural Room Transfer Function (BRTF), Head-Related Impulse Response (HRIR), Head-Related Transfer Function (HRTF) personalization that can implemented based on Applicant's U.S. patent application Ser. No. 16/062,521, filed 14 Jun. 2018 and entitled "A METHOD FOR GENERATING A CUSTOMIZED/PERSONALIZED HEAD RELATED TRANSFER FUNCTION", which is herein incorporated by reference in its entirety. For example, personalization may include implementing a method for enhancing audio rendering by generating a customized HRTF. The method includes: 1) acquiring a captured image of at least one ear of an individual using an image capturing device configured for processing a preliminary image that is a preliminary version of the captured image to provide feedback to a user; 2) generating a set of landmarks that correspond to control points from at least the preliminary image by applying a model to the preliminary image; 3) extracting image based properties from the generated set of landmarks for the individual from a finalized representation of the captured image; and 4) providing the image based properties to a selection processor configured to select a customized HRTF dataset from a plurality of HRTF datasets that have been determined for a plurality of individuals.

Further, conditioning 202 may include customizing the audio experience based on Applicant's U.S. patent application Ser. No. 16/279,929, filed 19 Feb. 2019 and entitled "SYSTEM AND A PROCESSING METHOD FOR CUSTOMIZING AUDIO EXPERIENCE", which is herein incorporated by reference in its entirety. For example, customizing the audio experience includes: 1) processing at least one captured image of a subject to generate at least one image-related input signal; 2) processing the at least one image-related input signal based on at least one database signal, which is communicable from at least one database to the processing apparatus, to generate a plurality of intermediate processor datasets; and 3) combining the plurality of intermediate processor datasets to produce at least one output signal. Various embodiments include: 1) wherein the at least one output signal corresponds to an audio response characteristic unique to the subject; 2) wherein the at least one image-related input signal corresponds to biometric data associated with the subject: 3) wherein the biometric data comprises a first biometric feature type and a second biometric feature type; 4) wherein the processing apparatus is capable of being trained to operate as a multi-recognizer corresponding to at least a first type recognizer and a second type recognizer; 5) wherein the processing apparatus is operable as the first type recognizer to generate a first set of intermediate processor datasets based on the first biometric feature type; 6) wherein the processing apparatus is operable as the second type recognizer to generate a second set of intermediate processor datasets based on the second biometric feature type; 7) wherein the first set of intermediate processor datasets and the second set of intermediate processor datasets are included in the plurality of intermediate processor datasets, and 8) wherein the at least one output signal is capable of being applied to input audio signals to generate output audio signals audibly perceivable by the subject so as to provide the subject with customized audio experience.

Conditioning 202 may also include providing a Head Related Transfer Function (HRTF) for application to an input audio signal for localizing audio to a set of headphones based on Applicant's U.S. patent application Ser. No. 16/136,211, filed 19 Sep. 2018 and entitled "METHOD FOR GENERATING CUSTOMIZED SPATIAL AUDIO WITH HEAD TRACKING", which is herein incorporated by reference in its entirety. For example, this may include: 1) accessing a plurality of Binaural Acoustic Impulse Response (BAIRs) pairs individualized for a listener at a reference position; 2) accessing a plurality of Binaural Acoustic Impulse Response (BAIRs) pairs for the listener corresponding to additional positions relative to the listener; 3) deriving a plurality of transfer functions for converting Binaural Acoustic Impulse Response (BAIRs) for the reference position relative to the listener to each of the additional positions by dividing each of the plurality of Binaural Acoustic Impulse Response (BAIRs) pairs for the additional positions by the Binaural Acoustic Impulse Response (BAIRs) pair for the reference position; 4) receiving a signal indicating a change in head orientation and selecting one pair of the plurality of transfer functions in response to and corresponding to the signal; and 5) applying the reference position Binaural Acoustic Impulse Response (BAIRs) pair and the selected pair of the plurality of transfer functions to the input audio signal to localize the audio in the set of headphones.

After conditioning the processed microphone signal, it may be either outputted for playback via right driver 108b directly alone or first combined with any separate conditioned audio content. As such, the invention allows the ability for a user to mix their acoustic environment in with their headphone audio content in creating an augmented audio experience. Again as before, processor/controller 120 can be configured to perform the processing of audio between multiple audio spaces according to various embodiments of the present invention.

Figure 3:
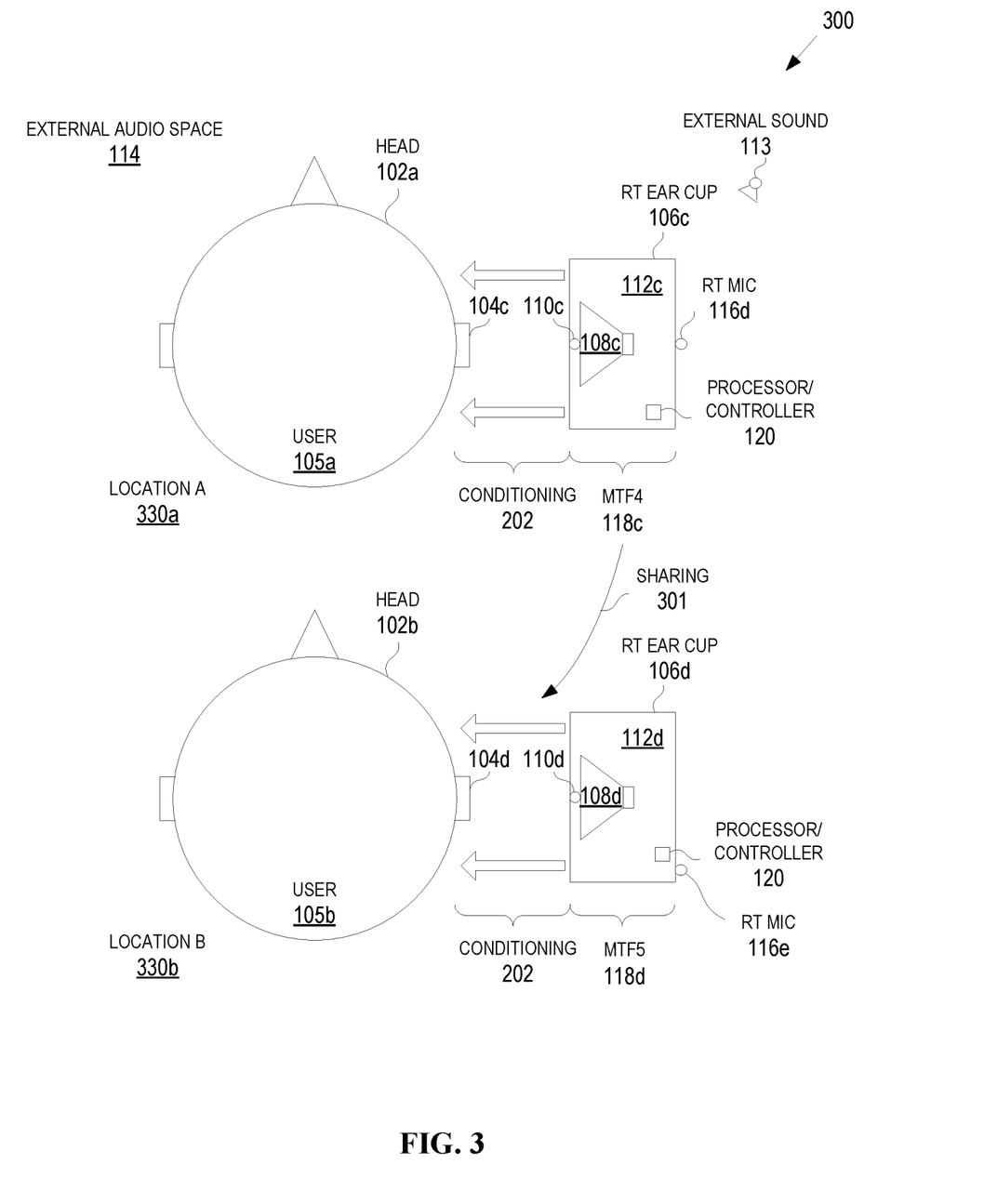
FIG. 3 is an audio system for processing audio between multiple audio spaces involving multiple audio reproduction devices according to various embodiments of the present invention.

FIG. 3 is an audio system 300 for processing audio between multiple audio spaces involving multiple audio reproduction devices according to various embodiments of the present invention. As shown, a user 105a at location A 330a has against a right ear 104c a right ear cup 106c with a processor/controller 120 for applying a corresponding MTF4 118c that transforms/virtualizes external sounds 113 captured with a microphone signal at external location (i.e., right side of right ear cup 106c) via a right microphone 116d to instead appear captured at an internal position (e.g., right driver output 110c, right driver 108c) within an internal audio space 112c. The processed (e.g., transformed/virtualized) microphone signal can be saved, recorded, or transmitted live to share 301 with user 105b at location B 330b. Location A 330a and location B 330b can either be in the same area (e.g., room or space) or in different areas (e.g., two separate rooms or spaces).

Any technique may be used to share the processed microphone signal including, but not limited to, Wi-Fi, Bluetooth, memory USB stick, memory SD card, wired connection, etc. Since microphone signal has been processed, user 105b can either render it with or without conditioning 202 and will be able to hear what user 105a hears with the processed microphone signal at least to the extent that the external sound captured at internal position (e.g., via transformation/virtualization) is similarly aligned to their ears or auditory path to their eardrums. For example, if processed microphone signal captures external sound at an optimal location (e.g., location A 330a is at a loudspeaker sweet spot), both user 105a and user 105b would hear external sound at the optimal location transformed/virtualized to an internal position for natural hearing. This sharing is possible regardless if user 105a and user 105b use the same/different headphones (e.g., right ear cup 106c, right ear cup 106d) or MTFs (e.g., MTF4 118c, MTF5 118d). The ability to share one's audio experience in a natural/realistic manner (e.g., hearing sounds as they would be captured from the position of your ears or as close to your eardrums) with another person is a benefit of the present invention.

Figure 4:
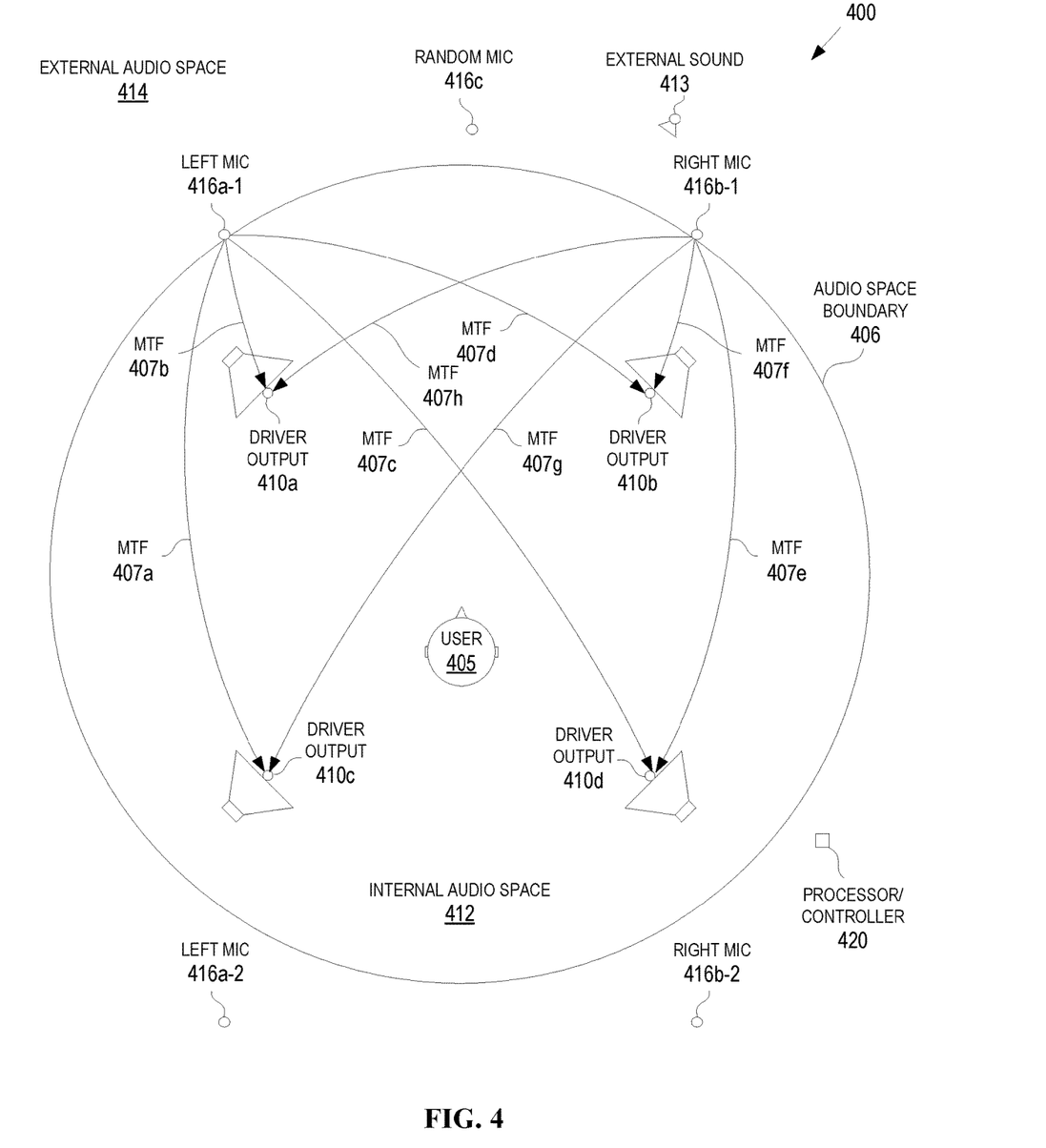
FIG. 4 is an audio system for processing audio between multiple audio spaces involving multiple audio reproduction devices according to various embodiments of the present invention.

FIG. 4 is an audio system 400 for processing audio between multiple audio spaces involving multiple audio reproduction devices according to various embodiments of the present invention. Audio system 400 includes one or more microphones such as left microphone 416a-1 and right microphone 416b-1 that are located on the audio space boundary 406, which separates an internal audio space 412 and an external audio space 414. Other microphones such as left microphone 416a-2, right microphone 416b-2, and random microphone 416c are positioned further away from the audio space boundary 406. The positioning of microphones is such that external sounds can be captured and processed by MTF. Further, the number of microphones will be based on the specific application. Generally, the more microphones there are, the better the ability to further condition the processed external sounds for specific information such as for a specific portion, placement, intensity, and etc. The specific information can among other things be used to provide situational awareness to the user or help identify the external sounds.

Audio space boundary 406 is generally located at a point where external sounds created in external audio space 414 are kept from being transmitted through to internal audio space 412. For example, in an automobile application where hearing or identifying external sounds could be useful for the driver, audio space boundary can be the shell of the automobile cabin whereas the internal audio space and external audio space respectively correspond to the inside cabin space and outside cabin space (e.g., outside the automobile). For another example, in a helmet that fully or partially encloses the head application, audio space boundary can be the shell of the helmet whereas the internal audio space and external audio space correspond to the inside of the helmet and outside of the helmet. The present invention is advantageously applicable in situations where external sounds upon their own transmissions cannot be heard in internal audio space or can be heard but are not useful (e.g., too low in intensity or not clear).

As shown in FIG. 4, audio system 400 has one or more drivers (e.g., loudspeakers) with corresponding driver outputs such as 410a, 410b, 410c, and 410d surrounding a user 405 within an internal audio space 412. Each driver and driver output can correspond to any channel (e.g. Front Left, Front Right, Rear Left, Rear Right, etc.). For example, the number of drivers can correspond to a mono, 2.0, 5.1, 7.1, or any number of channels of an audio loudspeaker setup. Audio system 400 further includes a processor/controller 420 for capturing external sound 413 on corresponding microphone signals with corresponding microphones (e.g., 416*a*-1, 416*b*-1, 416*a*-2, 416*b*-2, 416*c*) at corresponding external positions (e.g., usually at same positions as microphones are or somewhere close to them) and processing the microphone signals with corresponding MTFs (e.g., 407*a*, 407*b*, 407*c*, 407*d*, 407*e*, 407*f*, 407*g*, 407*h*) for corresponding internal positions (e.g., driver outputs 410*a*, 410*b*, 410*c*, 410*d*) in generating processed microphone signals that have transformed/virtualized the positioning of the capturing of external sound from the external positions to corresponding internal positions. The processed microphone signals may then be conditioned (e.g, Transaural Acoustic Crosstalk Cancellation, Beam Forming, Virtualization, Interaural Time Difference (ITD), Interaural Intensity Difference (IID), or Interaural Level Difference (ILD) for loudspeaker applications whereas Interaural Time Difference (ITD), Interaural Intensity Difference (IID), Interaural Level Difference (ILD), or HRIR/HRTF/BRIR/BRTF personalization for headphone applications). Conditioning may be applied anywhere before the processed microphone signals are rendered for playback. Further, the microphone signals with the captured external sound can also be conditioned or preconditioned before being used for processing with corresponding MTFs in generating the processed microphone signals. Such conditioning or preconditioning may any technique that would optimize the processing and later conditioning. Such techniques may include but not limited to noise canceling, noise reduction, and microphone transforms for changing signal domains.

Once the microphone signal is processed or processed and conditioned, it may be rendered immediately or first combined with any other audio content for playback via the one or more drivers. Other audio content may include a stream of prerecorded audio content such as music from various artists or audio from videos or a stream of live audio content such as music from a live concert. In a preferred embodiment, conditioning the other audio content is performed similar to conditioning the microphone signal or processed microphone signal as discussed previously. Audio content will generally be captured in an audio content signal and typically provided where capturing would appear as it was captured at an internal position, for example, where it could facilitate being heard naturally by a user such as the positions of driver output or along a user's auditory path to the user's eardrum.

According to various embodiments, processing and conditioning of the captured (live or recorded) external sound is based on factors such as driver location/placement; microphone location/placement; relative distances between microphones (e.g., external locations), drivers, and driver outputs (e.g., internal positions); system/MTF impulse responses; etc.

Figure 5:
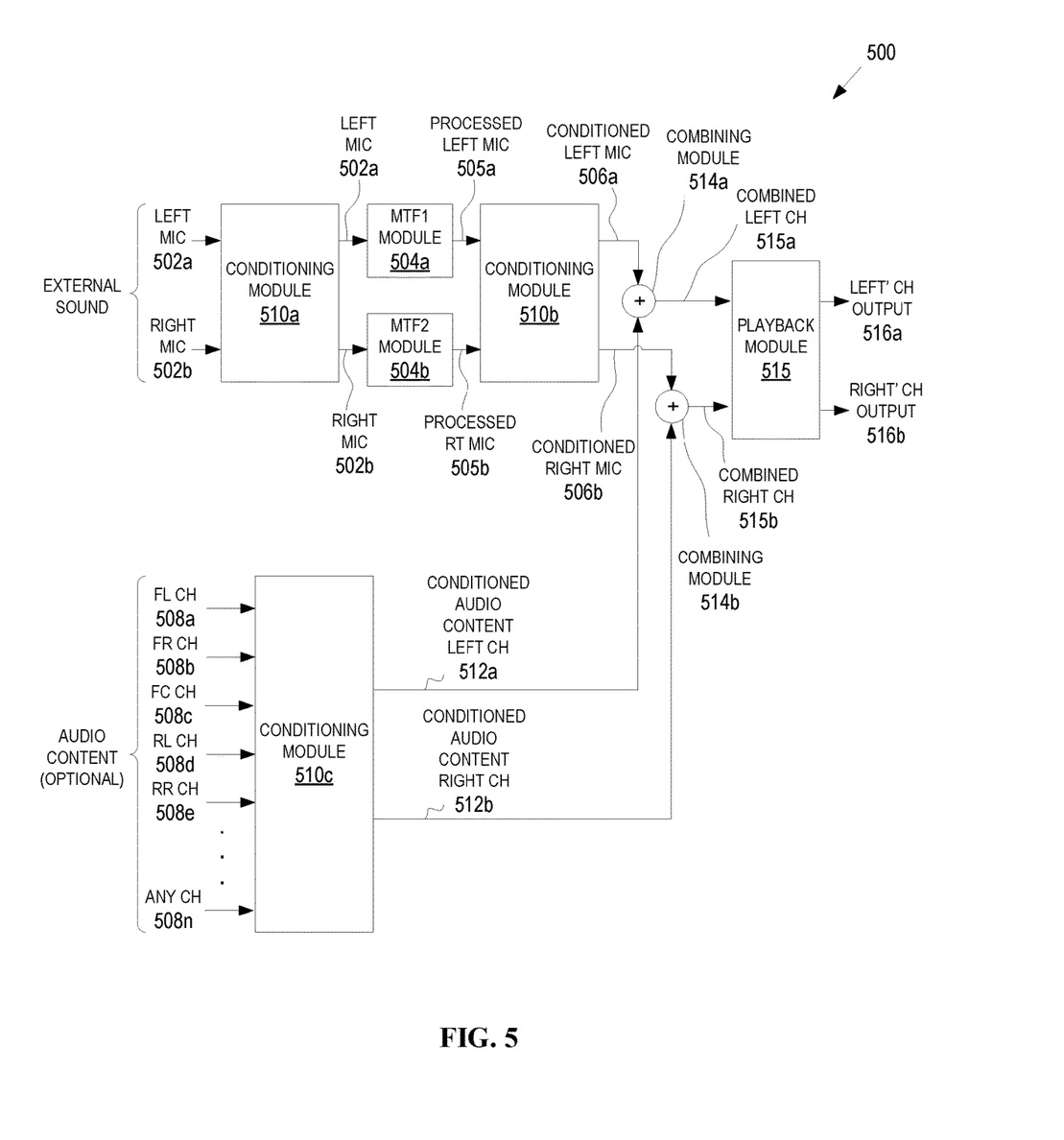
FIG. 5 is a system block diagram for processing audio between multiple audio spaces according to various embodiments of the present invention.

FIG. 5 is a system block diagram 500 for processing audio between multiple audio spaces according to various embodiments of the present invention. System block diagram 500 includes: one or more microphone transform function modules (e.g., 504*a*, 504*b*), conditioning modules (e.g., 510*a*, 510*b*, 510*c*), combining modules (e.g., 514*a*, 514*b*), and playback modules (e.g., 515). Any module may be combined or separated and implemented with a processor/controller onto one or more chips (e.g., DSP controller). As shown, MTF1 Module 504*a* and MTF2 Module 504*b* are configured for receiving external sound from an external audio space that is captured by a left microphone signal 502*a* and a right microphone signal 502*b* at corresponding external positions. Left microphone signal 502*a* and right microphone signal 502*b* may be conditioned or preconditioned 510*a* before being received by MTF1 Module 504*a* and MTF2 Module 504*b* in generating the processed microphone signals 505*a* and 505*b*. Such conditioning or preconditioning 510*a* may implement any technique that would optimize the processing 504*a* and 504*b* and later conditioning 510*b*. Such techniques may include but not limited to noise canceling, noise reduction, and microphone transforms for changing signal domains.

MTF1 Module 504*a* and MTF2 Module 504*b* are further configured for generating respective processed microphone signals 505*a* and 505*b* by processing left microphone signal 502*a* and right microphone signal 502*b* with MTF1 Module 504*a* and MTF2 Module 504*b* in order for virtualizing the capture of the external sound from microphone signals 502*a* and 502*b* corresponding to external positions (e.g., left microphone and right microphone positions) to internal positions with corresponding drivers (e.g., 108*a*, 110*a*, 108*b*, or 110*b*) in an internal audio space. The internal and external audio spaces are separated from each other by an audio space boundary.

According to some embodiments, MTF1 Module 504*a* and MTF2 Module 504*b* may each include one or more MTFs (same or different) generating one or more corresponding processed microphone signals that can be combined together (e.g., with same channel) or mixed together (e.g., with different channels) in generating one or more processed microphone signals. Yet, according to other embodiments, MTF1 Module 504*a* and MTF2 Module 504*b* are configured to generate one or more processed microphone signals that enhance certain sounds of the captured external sound. For example, processed microphone signal may enhance certain sounds by amplification or filtering. In a preferred embodiment, certain sounds that a user cannot hear are enhanced.

Audio conditioning module 510*b* is configured for generating conditioned microphone signals 506*a* and 506*b* by applying audio conditioning techniques to processed microphone signals 505*a* and 505*b*. In cases where the audio system is associated with loudspeakers, the audio conditioning techniques may include: Transaural Acoustic Crosstalk Cancellation, Beam Forming, Virtualization, Interaural Time Difference (ITD), Interaural Intensity Difference (IID), and/or Interaural Level Difference (ILD). Yet in cases where the audio system is associated with headphones, the audio conditioning techniques may include: Interaural Time Difference (ITD), Interaural Intensity Difference (IID), Interaural Level Difference (ILD), and/or HRIR/HRTF/BRIR/BRTF personalization.

Combining modules 514*a* and 514*b* are configured for generating combined output signals 515*a* and 515*b* by adding conditioned microphone signals 506*a* and 506*b* with conditioned audio content signals 512*a* and 512*b*, which are generated by conditioning module 510*c* that apply audio conditioning techniques to an audio content signal 508. Audio content signal 508 may include a number of signals corresponding to channels such as: front left channel 508*a*, front right channel 508*b*, front center channel 508*c*, rear left channel 508*d*, rear right channel 508*e* and so on to any channel 508*n*. As before, if the audio system is associated with loudspeakers, then the audio conditioning techniques may include: Transaural Acoustic Crosstalk Cancellation, Beam Forming, Virtualization, Interaural Time Difference (ITD), Interaural Intensity Difference (IID), and Interaural Level Difference (ILD). Yet, if the audio system is associated with headphones, then the audio conditioning techniques may include: Interaural Time Difference (ITD), Interaural Intensity Difference (IID), Interaural Level Difference (ILD), and HRIR/HRTF/BRIR/BRTF personalization.

In some embodiments, playback module 515 is configured for rendering processed microphone signal 505a and 505b without conditioning or combining via corresponding drivers for playback on outputs 516a and 516b in the internal audio space. The playback includes the external sound virtually captured by the left and right microphones at the designated internal positions. In other embodiments, playback module 515 is configured for rendering conditioned microphone signals 506a and 506b without combining with any audio content via corresponding drivers for playback on outputs 516a and 516b in the internal audio space. The playback includes the external sound virtually captured by the left and right microphones at the designated internal positions. Yet in other embodiments, playback module 515 is configured for rendering combined output signal 515a and 515b via corresponding drivers for playback on outputs 516a and 516b in the internal audio space. The playback includes the external sound virtually captured by the left and right microphones at the designated internal positions and audio content captured on the audio content signal.

Figure 6:
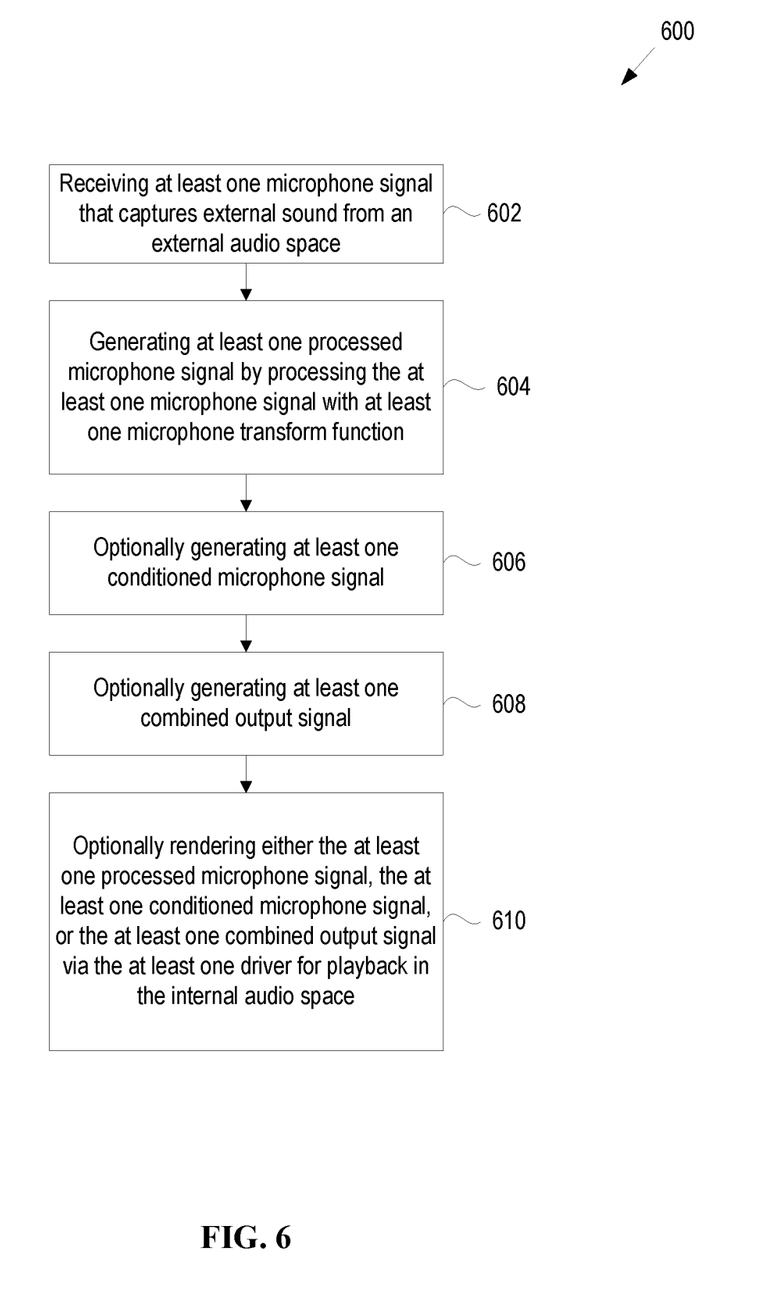
FIG. 6 is a flow diagram for processing audio between multiple audio spaces according to various embodiments of the present invention

FIG. 6 is a flow diagram 600 for processing audio between multiple audio spaces according to various embodiments of the present invention. Any step of flow diagram 600 may be performed in real time due to the low latency aspects of the present invention. As such, audio system 100, 200, 300, 400 may be implemented in real time to enhance a user's audio experience. At step 602, receiving at least one microphone signal that captures external sound from an external audio space is performed. The at least one microphone signal is generated by at least one microphone corresponding to at least one external position. In some embodiments, the at least one microphone signal captures external sound from the external audio space in real time. Yet, in some embodiments, the at least one microphone signal captures external sound from the external audio space in a recording. Sometimes it may be useful and beneficial that the at least one microphone signal is preconditioned by applying audio preconditioning techniques to the at least one microphone signal. The audio preconditioning techniques may include: noise canceling, noise reduction, microphone transforms for changing signal domains, and any technique to improve the transformation/virtualization in step 604 or conditioning in step 606.

At step 604, generating at least one processed microphone signal by processing the at least one microphone signal with at least one microphone transform function is performed. Step 604 is performed in order to transform/virtualize the capture of the external sound from the at least one microphone corresponding to the at least one external position to at least one internal position corresponding to at least one driver in an internal audio space. The internal and external audio spaces are separated from each other by an audio space boundary. In general, the audio space boundary attenuates open air transmission of the external sound from the external audio space to the internal audio space. For example, attenuation may result in less than 6 dB of external sound being measured in the internal audio space.

According to various embodiments, the microphone transform function implements a convolution involving the at least one microphone signal corresponding to the at least one external position, the at least one microphone signal corresponding to the at least one internal position, and at least one impulse response signal corresponding to the at least one external position and the at least one internal position. Yet, according to other embodiments, the microphone transform function may implement a fast Fourier transform (FFT), infinite impulse response (IIR) filter, and/or multirate filter bank. Although there can be cases where the microphone transform functions are the same, they can also be individually unique.

In some embodiments, the number of microphones does not have to match the number of drivers in the audio system. Although one microphone to one driver works, it is preferred to have at least two microphones and two drivers to allow for better spatial location of audio objects of external sound. The present invention can be applied to external sound from any number of microphones being transformed to any internal arbitrarily location speakers. If the audio system is associated with an automobile, the internal audio space can correspond to the inside of an automobile cabin and the external audio space can correspond to the outside of the automobile cabin. If the audio system is associated with a headphone, the internal audio space can correspond to the inside of a headphone ear cup and the external audio space can correspond to the outside of the headphone ear cup. In some embodiments, generating at least one processed microphone signal includes saving the at least one processed microphone signal for later playback. This is particularly useful for sharing amongst users. For example, this may allow user B to hear what user A heard at user A location. Further, if user A is sitting at a sweet spot, user B will hear the sound in the sweet spot even if user B is at a different location from user A location.

At step 606, optionally generating at least one conditioned microphone signal is performed. This can be done by applying audio conditioning techniques to the at least one processed microphone signal. If the audio system is associated with loudspeakers, then the audio conditioning techniques can include: Transaural Acoustic Crosstalk Cancellation, Beam Forming, Virtualization, Interaural Time Difference (ITD), Interaural Intensity Difference (IID), and Interaural Level Difference (ILD). If the audio system is associated with headphones, then the audio conditioning techniques can include: Interaural Time Difference (ITD), Interaural Intensity Difference (IID), Interaural Level Difference (ILD), and HRIR/HRTF/BRIR/BRTF personalization. Any other audio conditioning techniques may be used based appropriately on the application.

At step 608, optionally generating at least one combined output signal is performed. This can be done by adding the at least one conditioned microphone signal with at least one conditioned audio content signal. The at least one conditioned audio content signal can be generated by applying audio conditioning techniques to an audio content signal. If the audio system is associated with loudspeakers, then the audio conditioning techniques may include: Transaural Acoustic Crosstalk Cancellation, Beam Forming, Virtualization, Interaural Time Difference (ITD), Interaural Intensity Difference (IID), and Interaural Level Difference (ILD). If the audio system is associated with headphones, then the audio conditioning techniques can include: Interaural Time Difference (ITD), Interaural Intensity Difference (IID), Interaural Level Difference (ILD), and HRIR/HRTF/BRIR/BRTF personalization.

Finally at step 610, optionally rendering either the at least one processed microphone signal, the at least one conditioned microphone signal, or the at least one combined output signal via the at least one driver for playback in the internal audio space is performed. In the case for the at least one processed microphone signal, the playback includes the external sound virtually captured by the at least one microphone at the at least one internal position. In the case for the at least one conditioned microphone signal, the playback includes the external sound virtually captured by the left and right microphones at the designated internal positions. In the case for rendering the at least one combined output signal, the playback includes the external sound virtually captured by the at least one microphone at the at least one internal position and audio content captured on the audio content signal.

Figure 7:
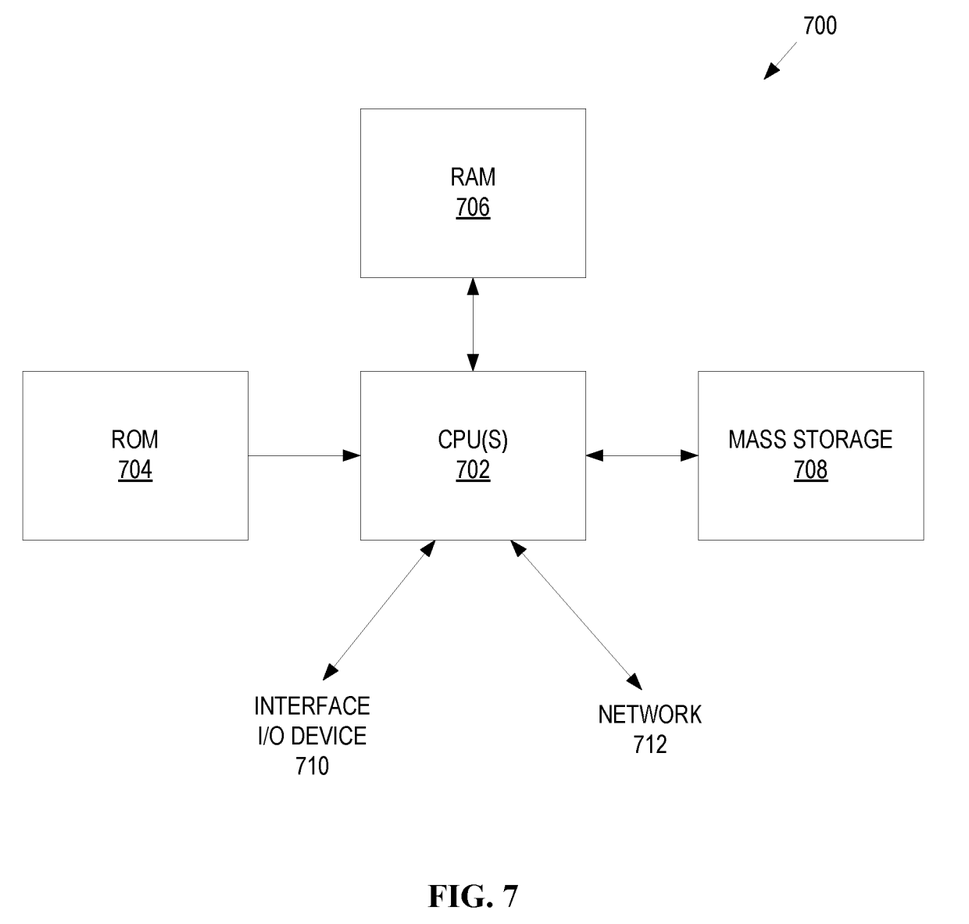
FIG. 7 illustrates a typical computer system that can be used in connection with one or more embodiments of the present invention.

This invention also relates to using a computer system according to one or more embodiments of the present invention. FIG. 7 illustrates a typical computer system 700 that can be used in connection with one or more embodiments of the present invention. The computer system 700 includes one or more processors 702 (also referred to as central processing units, or CPUs) that are coupled to storage devices including primary storage 706 (typically a random access memory, or RAM) and another primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media, including a computer program product comprising a machine readable medium on which is provided program instructions according to one or more embodiments of the present invention.

A mass storage device 708 also is coupled bi-directionally to CPU 702 and provides additional data storage capacity and may include any of the computer-readable media, including a computer program product comprising a machine readable medium on which is provided program instructions according to one or more embodiments of the present invention. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM may also pass data uni-directionally to the CPU.

CPU 702 also is coupled to an interface 710 that includes one or more input/output devices such as: video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

Advantageously, various embodiments of the present invention further provide: 1) the ability for a user to easily talk to another person without removing the user's headphone; 2) the ability for a user to mix their acoustic environment in with their headphone audio content in creating an augmented audio experience; 3) replicating the direction/location of sounds of a given environment as a user would naturally hear them; 4) sharing a given environment with other users; 5) the applicability of the techniques to cases where the microphone for capturing external sound can be located larger distances away from a user's ear (in other words, the microphone does not need to be physically located in your ear such as in binaural recordings).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing audio between multiple audio spaces with an audio system, comprising:
    receiving at least one microphone signal that captures external sound from an external audio space with at least one microphone corresponding to at least one external position in the external audio space; and
    generating at least one processed microphone signal by processing the at least one microphone signal with at least one microphone transform function in order for virtualizing the capture of the external sound from a position of the at least one microphone corresponding to the at least one external position in the external audio space to at least one driver corresponding to at least one internal position in an internal audio space,
    wherein the virtualized capture of the external sound is perceivable by a user from the position of the at least one driver corresponding to the at least one internal position in the internal audio space relative to the external sound's corresponding position in the external audio space; and
    wherein the internal and external audio spaces are separated from each other by an audio space boundary.

2. The method as recited in claim 1, wherein the at least one microphone does not match the at least one driver in quantity.

3. The method as recited in claim 1, wherein the at least one microphone signal captures external sound from the external audio space in real time.

4. The method as recited in claim 1,
    wherein the audio system is either: (1) associated with an automobile where the internal audio space is inside of an automobile cabin and the external audio space is outside of the automobile cabin; or (2) associated with a headphone where the internal audio space is inside of a headphone ear cup and the external audio space is outside of the headphone ear cup; or (3) associated with a helmet where the internal audio space is inside of a helmet shell and the external audio space is outside of the helmet shell.

5. The method as recited in claim 1, wherein the microphone transform function implements a convolution involving the at least one microphone signal corresponding to the at least one external position and at least one impulse response signal corresponding to the at least one external position and the at least one internal position.

6. The method as recited in claim 1, wherein generating the at least one processed microphone signal comprises enhancing certain sounds of the captured external sound that humans are unable to hear.

7. The method as recited in claim 1, wherein the at least one microphone signal is preconditioned by applying audio preconditioning techniques to the at least one microphone signal, the audio preconditioning techniques being selected from the group consisting of noise canceling, noise reduction, and microphone transforms for changing signal domains.

8. The method as recited in claim 1, wherein the at least one microphone signal captures external sound from the external audio space in a recording.

9. The method as recited in claim 1, wherein generating the at least one processed microphone signal comprises saving the at least one processed microphone signal for later playback.

10. The method as recited in claim 1, wherein the audio space boundary attenuates open air transmission of the external sound from the external audio space to the internal audio space such that less than 6 dB of external sound is measurable in the internal audio space.

11. The method as recited in claim 1, further comprising:
rendering the at least one processed microphone signal via the at least one driver for playback in the internal audio space, whereby the playback includes the external sound virtually captured by the at least one microphone at the at least one internal position.

12. A method for processing audio between multiple audio spaces with an audio system, comprising:
receiving at least one microphone signal that captures external sound from an external audio space with at least one microphone corresponding to at least one external position;
generating at least one processed microphone signal by processing the at least one microphone signal with at least one microphone transform function in order for virtualizing the capture of the external sound from the at least one microphone corresponding to the at least one external position to at least one internal position corresponding to at least one driver in an internal audio space, the internal and external audio spaces being separated from each other by an audio space boundary; and
generating at least one conditioned microphone signal by applying at least one audio conditioning technique to the at least one processed microphone signal,
wherein the audio system is either: (1) associated with loudspeakers where the at least one audio conditioning technique is selected from the group consisting of Transaural Acoustic Crosstalk Cancellation, Beam Forming, Virtualization, Interaural Time Difference (ITD), Interaural Intensity Difference (IID), and Interaural Level Difference (ILD); or (2) associated with headphones where the at least one audio conditioning technique is selected from the group consisting of Interaural Time Difference (ITD), Interaural Intensity Difference (IID), Interaural Level Difference (ILD), and HRIR/HRTF/BRIR/BRTF personalization.

13. The method as recited in claim 12, further comprising:
generating at least one combined output signal by adding the at least one conditioned microphone signal with at least one conditioned audio content signal, the at least one conditioned audio content signal being generated by applying the at least one audio conditioning technique to an audio content signal.

14. The method as recited in claim 13, further comprising:
rendering the at least one combined output signal via the at least one driver for playback in the internal audio space, whereby the playback includes the external sound virtually captured by the at least one microphone at the at least one internal position and audio content captured on the audio content signal.

15. An audio system for processing audio between multiple audio spaces, comprising:
at least one microphone transform function module configured for receiving at least one microphone signal that captures external sound from an external audio space with at least one microphone corresponding to at least one external position in the external audio space, and for generating at least one processed microphone signal by processing the at least one microphone signal with at least one microphone transform function in order for virtualizing the capture of the external sound from a position of the at least one microphone corresponding to the at least one external position in the external audio space to at least one driver corresponding to at least one internal position in an internal audio space, wherein the virtualized capture of the external sound is perceivable by a user from the position of the at least one driver corresponding to the at least one internal position in the internal audio space relative to the external sound's corresponding position in the external audio space, and wherein the internal and external audio spaces are separated from each other by an audio space boundary.

16. An audio system for processing audio between multiple audio spaces, comprising:
at least one microphone transform function module configured for receiving at least one microphone signal that captures external sound from an external audio space with at least one microphone corresponding to at least one external position, and for generating at least one processed microphone signal by processing the at least one microphone signal with at least one microphone transform function in order for virtualizing the capture of the external sound from the at least one microphone corresponding to the at least one external position to at least one internal position corresponding to at least one driver in an internal audio space, the internal and external audio spaces being separated from each other by an audio space boundary; and
at least one audio conditioning module configured for generating at least one conditioned microphone signal by applying at least one audio conditioning technique to the at least one processed microphone signal,
wherein the audio system is either: (1) associated with loudspeakers where the at least one audio conditioning technique is selected from the group consisting of Transaural Acoustic Crosstalk Cancellation, Beam Forming, Virtualization, Interaural Time Difference (ITD), Interaural Intensity Difference (IID), and Interaural Level Difference (ILD); or (2) associated with headphones where the at least one audio conditioning technique is selected from the group consisting of Interaural Time Difference (ITD), Interaural Intensity Difference (IID), Interaural Level Difference (ILD), and HRIR/HRTF/BRIR/BRTF personalization.

17. The audio system as recited in claim 16, further comprising:
at least one combining module configured for generating at least one combined output signal by adding the at least one conditioned microphone signal with at least one conditioned audio content signal, the at least one conditioned audio content signal being generated by applying the at least one audio conditioning technique to an audio content signal.

18. The audio system as recited in claim 16, further comprising:

at least one playback module configured for rendering the at least one conditioned microphone signal via the at least one driver for playback in the internal audio space, whereby the playback includes the external sound virtually captured by the at least one microphone at the at least one internal position.

19. The audio system as recited in claim 17, further comprising:
at least one playback module configured for rendering the at least one combined output signal via the at least one driver for playback in the internal audio space, whereby the playback includes the external sound virtually captured by the at least one microphone at the at least one internal position and audio content captured on the audio content signal.

20. A computer program product for processing audio between multiple audio spaces with an audio system, the computer program product being embodied in a non-transitory computer readable medium and comprising computer executable instructions for:
receiving at least one microphone signal that captures external sound from an external audio space with at least one microphone corresponding to at least one external position in the external audio space; and
generating at least one processed microphone signal by processing the at least one microphone signal with at least one microphone transform function in order for virtualizing the capture of the external sound from a position of the at least one microphone corresponding to the at least one external position in the external audio space to at least one driver corresponding to at least one internal position in an internal audio space, wherein the virtualized capture of the external sound is perceivable by a user from the position of the at least one driver corresponding to the at least one internal position in the internal audio space relative to the external sound's corresponding position in the external audio space, and wherein the internal and external audio spaces are separated from each other by an audio space boundary.

21. A method for processing audio between multiple audio spaces with an audio system, comprising:
receiving at least one microphone signal that captures external sound from an external audio space with at least one microphone corresponding to at least one external position in the external audio space; and
generating at least one processed microphone signal by processing the at least one microphone signal with at least one microphone transform function in order for virtualizing the capture of the external sound
wherein the virtualized capture of the external sound is perceivable by a user from a first perspective of at least one driver corresponding to at least one internal position in an internal audio space instead of from a second perspective of the at least one microphone corresponding to the at least one external position in the external audio space; and
wherein the internal and external audio spaces are separated from each other by an audio space boundary.

22. A method for processing audio between multiple audio spaces with an audio system, comprising:
receiving at least one microphone signal that captures external sound from an external audio space with at least one microphone corresponding to at least one external position in the external audio space; and
generating at least one processed microphone signal by processing the at least one microphone signal with at least one microphone transform function in order for virtualizing the capture of the external sound,
wherein the virtualized capture of the external sound is perceivable by a user from a first perspective of at least one internal position in an internal audio space that corresponds to at least one driver instead of from a second perspective of the at least one external position in the external audio space that corresponds to the at least one microphone; and
wherein the internal and external audio spaces are separated from each other by an audio space boundary.

* * * * *